(12) United States Patent
Sridharan et al.

(10) Patent No.: US 11,825,412 B2
(45) Date of Patent: Nov. 21, 2023

(54) COORDINATED SIDELINK AND ACCESS LINK POWER SAVINGS CONFIGURATIONS

(71) Applicant: QUALCOMM Incorporated, San Diego, CA (US)

(72) Inventors: Gokul Sridharan, Sunnyvale, CA (US); Seyedkianoush Hosseini, San Diego, CA (US); Karthika Paladugu, San Diego, CA (US); Huilin Xu, San Diego, CA (US); Peter Pui Lok Ang, San Diego, CA (US); Linhai He, San Diego, CA (US); Wei Yang, San Diego, CA (US); Sudhir Kumar Baghel, Hillsborough, NJ (US); Krishna Kiran Mukkavilli, San Diego, CA (US); Tingfang Ji, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/127,176

(22) Filed: Dec. 18, 2020

(65) Prior Publication Data

US 2021/0195519 A1 Jun. 24, 2021

Related U.S. Application Data

(60) Provisional application No. 62/953,364, filed on Dec. 24, 2019.

(51) Int. Cl.
*H04W 52/02* (2009.01)
*H04W 28/02* (2009.01)
*H04W 76/28* (2018.01)

(52) U.S. Cl.
CPC ......... *H04W 52/0216* (2013.01); *H04W 28/0268* (2013.01); *H04W 52/0235* (2013.01); *H04W 76/28* (2018.02)

(58) Field of Classification Search
CPC ......... H04W 52/0216; H04W 28/0268; H04W 52/0235; H04W 76/28; H04W 52/0258;
(Continued)

(56) References Cited

U.S. PATENT DOCUMENTS

2014/0211696 A1* 7/2014 Chai .................. H04W 76/14
370/328
2016/0044652 A1* 2/2016 Xue ................... H04W 74/006
370/329
(Continued)

FOREIGN PATENT DOCUMENTS

WO 2017196611 A1 11/2017

OTHER PUBLICATIONS

3GPP TSG RAN WG2#98; R2-1704718; Source: Huawei, Hisilicon; Title: Some considerations about DRX on PC5; Hangzhou, China, May 15-19, 2017 (Year: 2017).*
(Continued)

*Primary Examiner* — Mohammed S Chowdhury
(74) *Attorney, Agent, or Firm* — Patterson + Sheridan, L.L.P.

(57) ABSTRACT

Certain aspects of the present disclosure provide techniques for coordinated power savings configurations for access link and sidelink(s). A wireless node may receive information from a user equipment (UE) over a sidelink. In some aspects, the wireless node forwards the information to a base station (BS) over an access link and receives, from the BS, a first power savings configuration for the access link and a second power savings configuration for the sidelink. In some aspects, the wireless node receives, from a BS, a first power
(Continued)

savings configuration for an access link and determines a second power savings configuration for the sidelink based on the information and the first power savings configuration.

58 Claims, 17 Drawing Sheets

(58) Field of Classification Search
CPC ............... H04W 76/14; H04W 92/18; H04W 52/0229; H04W 28/0221; Y02D 30/70
See application file for complete search history.

(56) References Cited

U.S. PATENT DOCUMENTS

| 2016/0044740 | A1* | 2/2016 | Siomina | H04W 72/02 455/552.1 |
| 2019/0174411 | A1* | 6/2019 | Xu | H04W 72/0406 |
| 2021/0037468 | A1* | 2/2021 | Huang | H04W 76/14 |

OTHER PUBLICATIONS

3GPP TSG-RAN WG2 Meeting #97bis; R2-1703593; Source: Sequans Communications; Title: Discussion on paging relay and sidelink maintenance; Spokane, USA, Apr. 3-7, 2017. (Year: 2017).*
International Search Report and Written Opinion—PCT/US2020/066264—ISA/EPO—dated Apr. 9, 2021.

* cited by examiner

COORDINATED SIDELINK AND ACCESS LINK POWER SAVINGS CONFIGURATIONS

CROSS-REFERENCE TO RELATED APPLICATION(S)

This application claims benefit of and priority to U.S. Provisional Application No. 62/953,364, filed Dec. 24, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for coordinated power savings configurations for devices with concurrent access link and sidelink.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved sidelink control information (SCI) transmission.

One or more aspects of the subject matter described in this disclosure can be implemented in a method for wireless communication by a wireless node. The method generally includes receiving information from a user equipment (UE) over a sidelink. The method generally includes forwarding the information to a base station (BS) over an access link. The method generally includes receiving, from the BS, a first power savings configuration for the access link and a second power savings configuration for the sidelink.

One or more aspects of the subject matter described in this disclosure can be implemented in a method for wireless communication by a wireless node. The method generally includes receiving information from a UE over a sidelink. The method generally includes receiving, from a BS, a first power savings configuration for an access link. The method generally includes determining a second power savings configuration for the sidelink based on the information and the first power savings configuration.

One or more aspects of the subject matter described in this disclosure can be implemented in a method for wireless communication by a UE. The method generally includes sending information to a wireless node over a sidelink. The method generally includes receiving, from the wireless node, a second power savings configuration for the sidelink, the second power savings configuration being based, at least in part, on the information.

One or more aspects of the subject matter described in this disclosure can be implemented in a method for wireless communication by a BS. The method generally includes receiving information from a wireless node over an access link. The method generally includes determining a first power savings configuration for the access link and a second power savings configuration for a sidelink between the wireless node and a UE based, at least in part, on the information. The method generally includes sending, to the wireless node, the first power savings configuration for the access link and the second power savings configuration for the sidelink.

One or more aspects of the subject matter described in this disclosure can be implemented in a method for wireless communication by a BS. The method generally includes sending, to a wireless node, a first power savings configuration for an access link between the BS and the wireless node. The method generally includes receiving, from the wireless node, a second power savings configuration for a sidelink between the wireless node and a UE.

One or more aspects of the subject matter described in this disclosure can be implemented in an apparatus for wireless communication. The apparatus generally includes at least one processor and a memory coupled to the at least one processor. The memory generally includes code executable by the at least one processor to cause the apparatus to receive information from a UE over a sidelink. The memory generally includes code executable by the at least one processor to cause the apparatus to forward the information to a BS over an access link. The memory generally includes code executable by the at least one processor to cause the apparatus to receive, from the BS, a first power savings configuration for the access link and a second power savings configuration for the sidelink.

One or more aspects of the subject matter described in this disclosure can be implemented in an apparatus for wireless communication. The apparatus generally includes at least one processor and a memory coupled to the at least one processor. The memory generally includes code executable by the at least one processor to cause the apparatus to receive information from a UE over a sidelink. The memory generally includes code executable by the at least one processor to cause the apparatus to receive, from a BS, a first power savings configuration for an access link. The memory generally includes code executable by the at least one processor to cause the apparatus to determine a second power savings configuration for the sidelink based on the information and the first power savings configuration.

One or more aspects of the subject matter described in this disclosure can be implemented in an apparatus for wireless communication. The apparatus generally includes at least one processor and a memory coupled to the at least one processor. The memory generally includes code executable by the at least one processor to cause the apparatus to send information to a wireless node over a sidelink. The memory generally includes code executable by the at least one processor to cause the apparatus to receive, from the wireless node, a second power savings configuration for the sidelink, the second power savings configuration being based, at least in part, on the information.

One or more aspects of the subject matter described in this disclosure can be implemented in an apparatus for wireless communication. The apparatus generally includes at least one processor and a memory coupled to the at least one processor. The memory generally includes code executable by the at least one processor to cause the apparatus to receive information from a wireless node over an access link. The memory generally includes code executable by the at least one processor to cause the apparatus to determine a first power savings configuration for the access link and a second power savings configuration for a sidelink between the wireless node and a UE based, at least in part, on the information. The memory generally includes code executable by the at least one processor to cause the apparatus to send, to the wireless node, the first power savings configuration for the access link and the second power savings configuration for the sidelink.

One or more aspects of the subject matter described in this disclosure can be implemented in an apparatus for wireless communication. The apparatus generally includes at least one processor and a memory coupled to the at least one processor. The memory generally includes code executable by the at least one processor to cause the apparatus to send, to a wireless node, a first power savings configuration for an access link between the BS and the wireless node. The memory generally includes code executable by the at least one processor to cause the apparatus to receive, from the wireless node, a second power savings configuration for a sidelink between the wireless node and a UE.

One or more aspects of the subject matter described in this disclosure can be implemented in an apparatus for wireless communication. The apparatus generally includes means for receiving information from a UE over a sidelink. The apparatus generally includes means for forwarding the information to a BS over an access link. The apparatus generally includes means for receiving, from the BS, a first power savings configuration for the access link and a second power savings configuration for the sidelink.

One or more aspects of the subject matter described in this disclosure can be implemented in an apparatus for wireless communication. The apparatus generally includes means for receiving information from a UE over a sidelink. The apparatus generally includes means for receiving, from a BS, a first power savings configuration for an access link. The apparatus generally includes means for determining a second power savings configuration for the sidelink based on the information and the first power savings configuration.

One or more aspects of the subject matter described in this disclosure can be implemented in an apparatus for wireless communication. The apparatus generally includes means for sending information to a wireless node over a sidelink. The apparatus generally includes means for receiving, from the wireless node, a second power savings configuration for the sidelink, the second power savings configuration being based, at least in part, on the information.

One or more aspects of the subject matter described in this disclosure can be implemented in an apparatus for wireless communication. The apparatus generally includes means for receiving information from a wireless node over an access link. The apparatus generally includes means for determining a first power savings configuration for the access link and a second power savings configuration for a sidelink between the wireless node and a UE based, at least in part, on the information. The apparatus generally includes means for sending, to the wireless node, the first power savings configuration for the access link and the second power savings configuration for the sidelink.

One or more aspects of the subject matter described in this disclosure can be implemented in an apparatus for wireless communication. The apparatus generally includes means for sending, to a wireless node, a first power savings configuration for an access link between the BS and the wireless node. The apparatus generally includes means for receiving, from the wireless node, a second power savings configuration for a sidelink between the wireless node and a UE.

One or more aspects of the subject matter described in this disclosure can be implemented in a computer readable medium storing computer executable code thereon for wireless communication. The computer executable code generally includes code for receiving information from a UE over a sidelink. The computer executable code generally includes code for forwarding the information to a BS over an access link. The computer executable code generally includes code for receiving, from the BS, a first power savings configuration for the access link and a second power savings configuration for the sidelink.

One or more aspects of the subject matter described in this disclosure can be implemented in a computer readable medium storing computer executable code thereon for wireless communication. The computer executable code generally includes code for receiving information from a UE over a sidelink. The computer executable code generally includes code for receiving, from a BS, a first power savings configuration for an access link. The computer executable code generally includes code for determining a second power savings configuration for the sidelink based on the information and the first power savings configuration.

One or more aspects of the subject matter described in this disclosure can be implemented in a computer readable medium storing computer executable code thereon for wireless communication. The computer executable code generally includes code for sending information to a wireless node over a sidelink. The computer executable code generally includes code for receiving, from the wireless node, a second power savings configuration for the sidelink, the second power savings configuration being based, at least in part, on the information.

One or more aspects of the subject matter described in this disclosure can be implemented in a computer readable medium storing computer executable code thereon for wireless communication. The computer executable code generally includes code for receiving information from a wireless node over an access link. The computer executable code generally includes code for determining a first power savings configuration for the access link and a second power savings configuration for a sidelink between the wireless node and a UE based, at least in part, on the information. The computer executable code generally includes code for sending, to the wireless node, the first power savings configuration for the access link and the second power savings configuration for the sidelink.

One or more aspects of the subject matter described in this disclosure can be implemented in a computer readable medium storing computer executable code thereon for wireless communication. The computer executable code generally includes code for sending, to a wireless node, a first power savings configuration for an access link between the BS and the wireless node. The computer executable code generally includes code for receiving, from the wireless node, a second power savings configuration for a sidelink between the wireless node and a UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
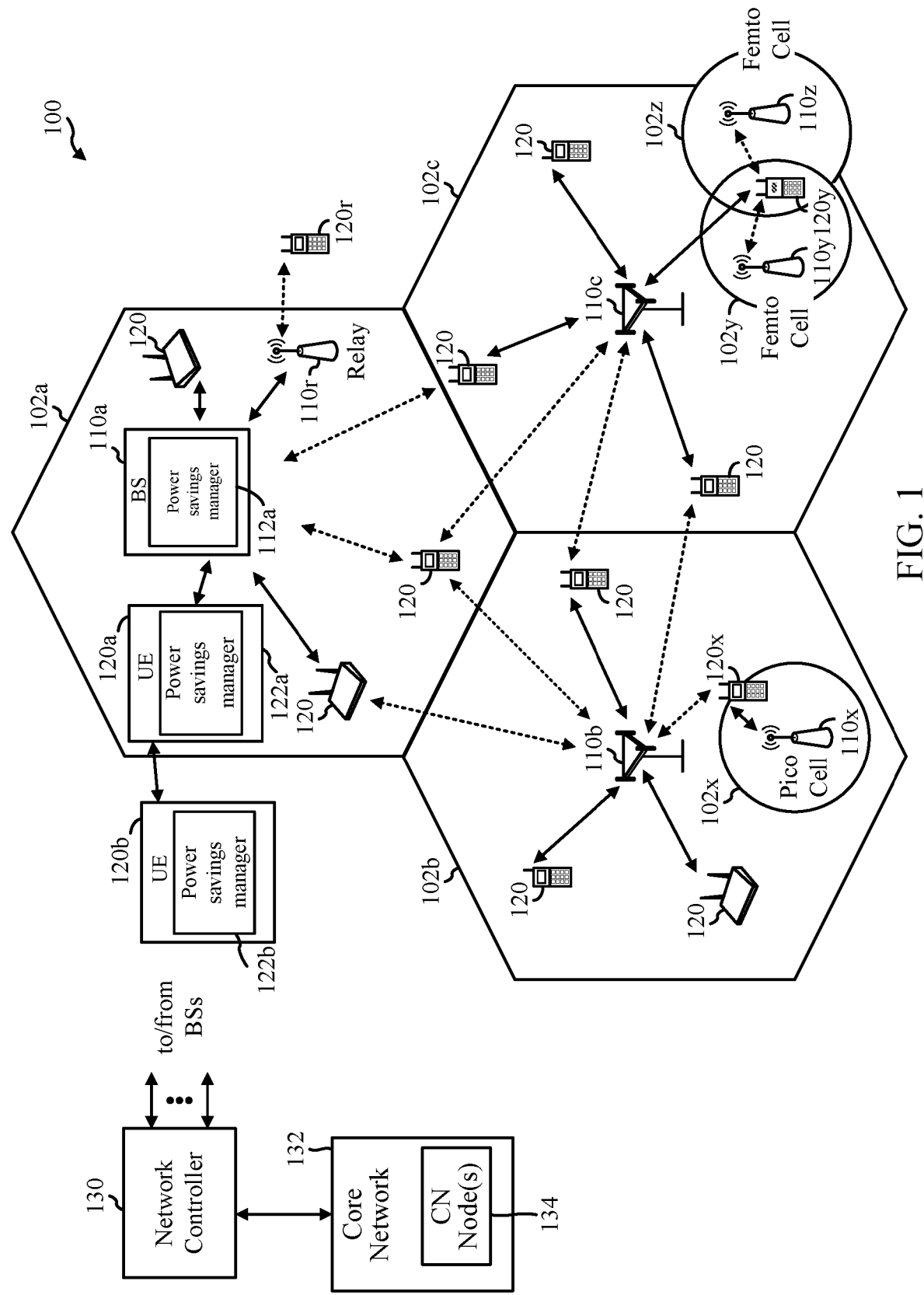
FIG. 1 is a block diagram conceptually illustrating an example telecommunications system, in accordance with certain aspects of the present disclosure.

Aspects of the present disclosure provide example apparatus, methods, processing systems, and computer readable mediums implementing techniques for use in wireless communication. For examples, techniques are provided herein for coordinated power savings configurations for a wireless node with concurrent access link and sidelink(s).

Power saving techniques, such as a discontinuous reception (DRX) mode, may allow a wireless node, such as a user equipment (UE) to enter a low power mode for durations in which the UE does not transmit and/or receive and to exit the low power mode for durations in which the UE monitors for transmissions and/or sends transmissions. In some cases, a UE may communicate over an access link with a base station (BS) and also over one or more sidelinks with one or more other UEs. The UE may utilize separate power saving configurations for the access link and sidelink(s). Without coordination of the power saving configurations, the UE may achieve power savings, due to the low power durations for the different configurations not being aligned/coordinated.

The techniques presented herein allow the BS and/or the wireless node to coordinate power savings configurations for the access link and sidelink(s). In some examples, the BS decides the power savings configurations for the access link and sidelink(s) and indicates the selected power savings configurations to the wireless node. In some examples, the wireless node decide the sidelink power savings configuration(s). In some examples, sidelink UEs provide the wireless node with information, such as a proposed sidelink power savings configuration, that may be used by the BS or wireless node to help decide (e.g., to coordinate) the power savings configurations.

The following description provides examples of coordinated power savings configurations for access link and sidelink(s), and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems including later technologies.

NR access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). The core network 132 may be in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for sidelink communications. As shown in FIG. 1, the UE 120a includes a power savings manager 122a, the UE 120b includes a power savings manager 122b, and the BS 110a includes a power savings manager 112a. The power savings manager 122a, the power savings manager 122b, and/or the power savings manager 112a may be configured to determine, send, receive, and/or apply a first power savings configuration for an access link and/or a second power savings configuration for a sidelink, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul.

Figure 2:
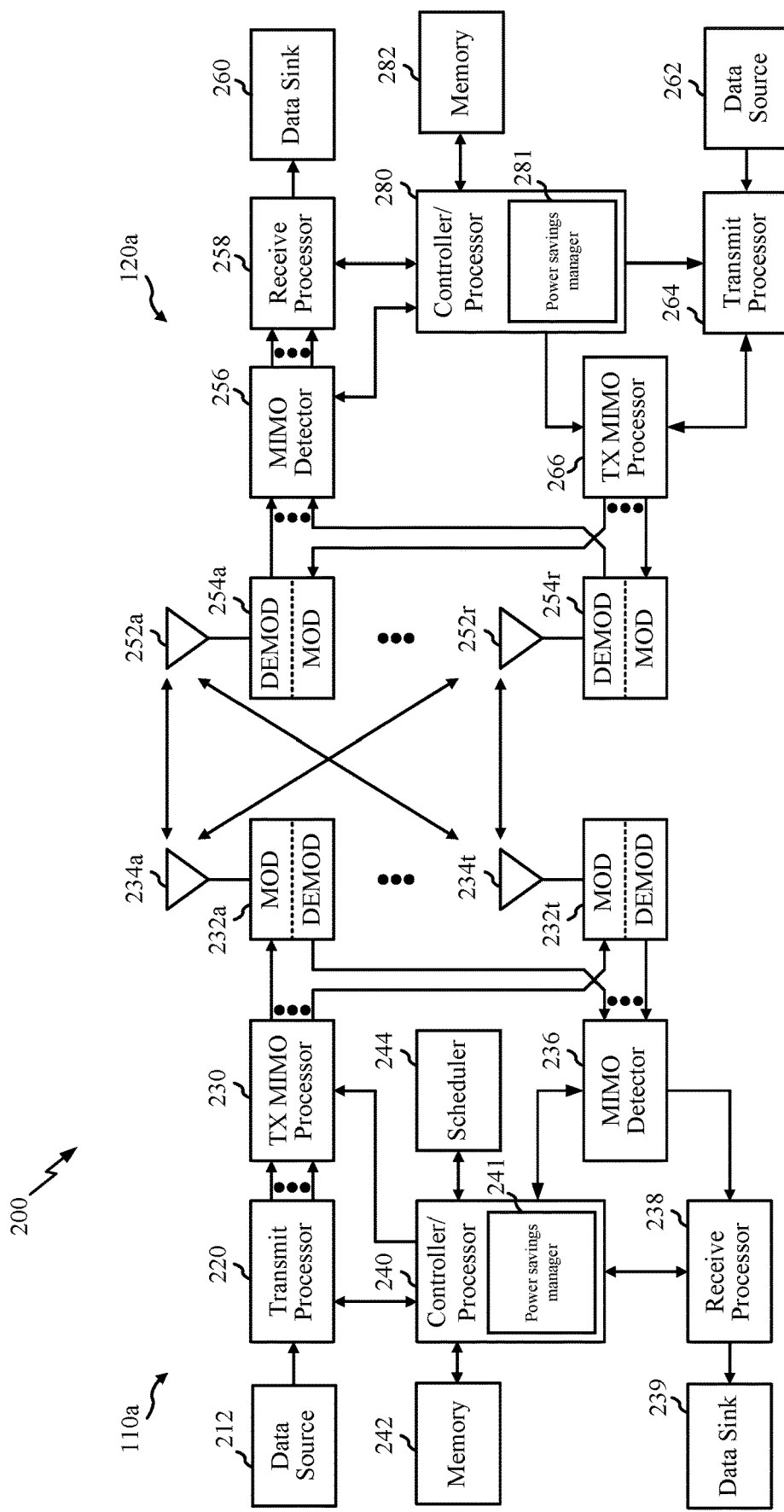
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a, or sidelink signals from the UE 120b, and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink and/or sidelink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238 may be used to perform the various techniques and methods described herein. For example, as shown in FIG. 2, the controller/processor 280 of the UE 120a has a power saving manager 281 and the controller/processor 240 of the BS 110a has a power saving manager 241. The power saving manager 281 and/or the power saving manager 241 may be configured for coordinated power savings configurations for the access link and sidelink.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
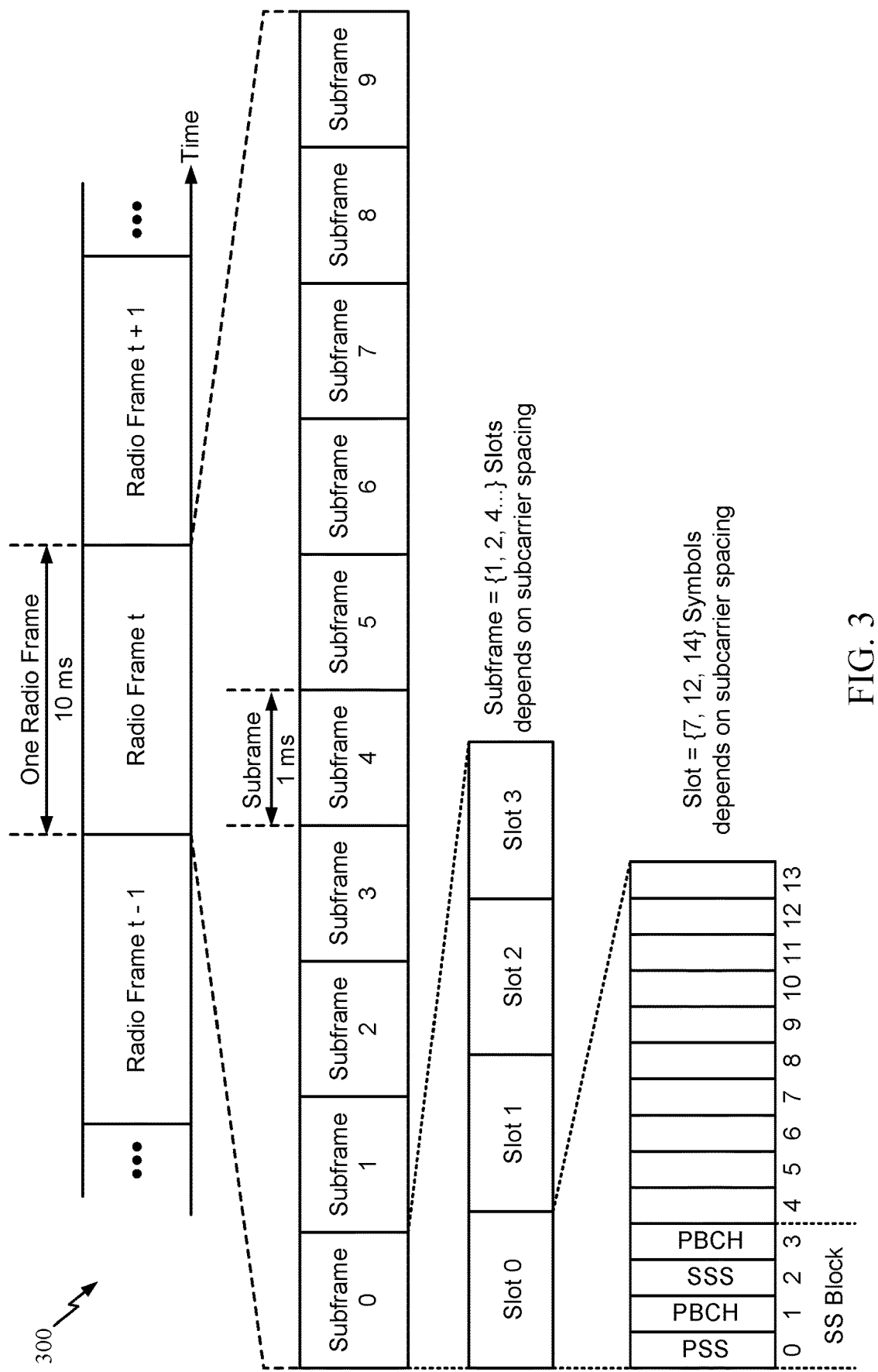
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 4:
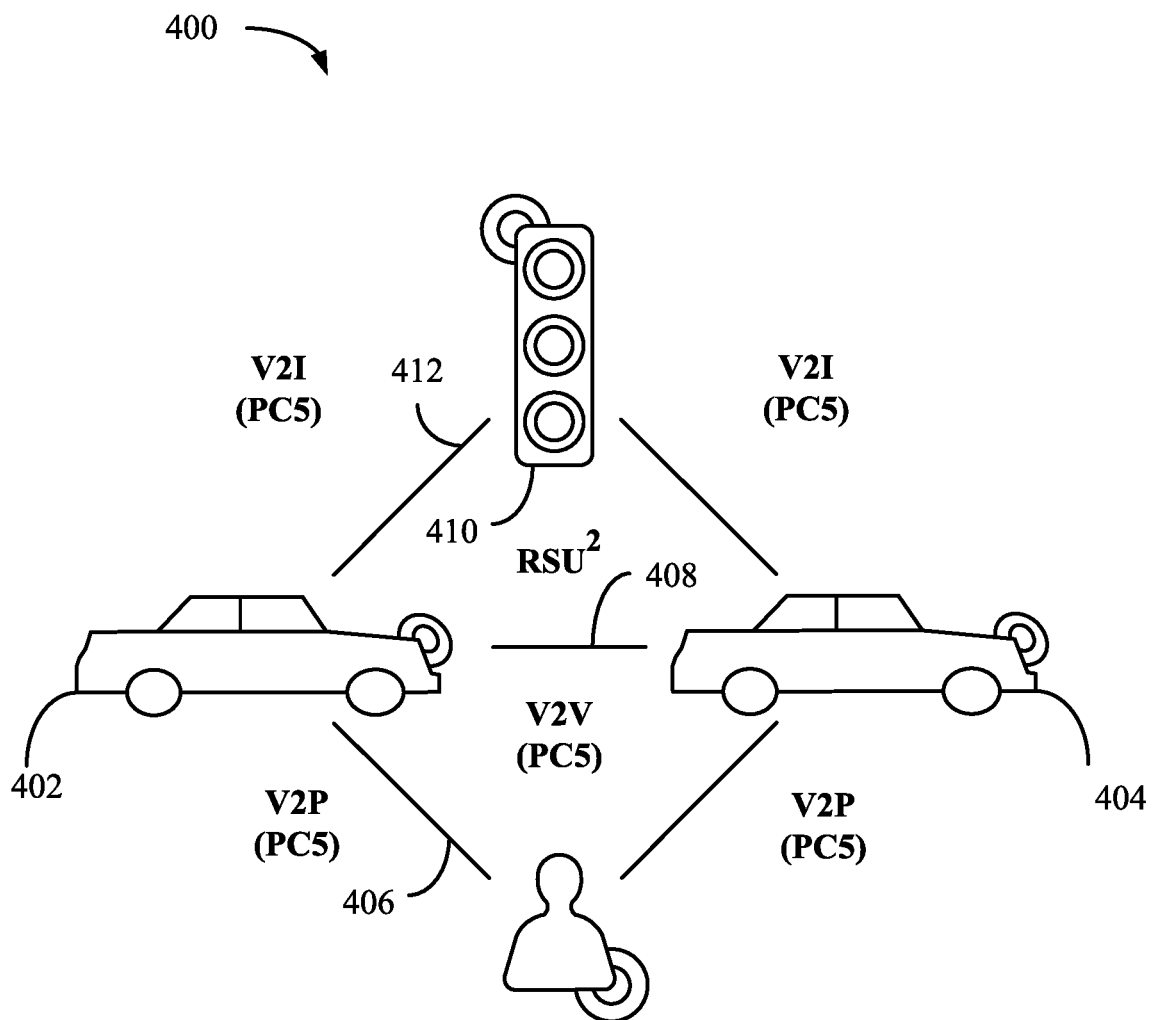
FIG. 4 show diagrammatic representations of example vehicle-to-everything (V2X) systems, in accordance with certain aspects of the present disclosure.
Figure 5:
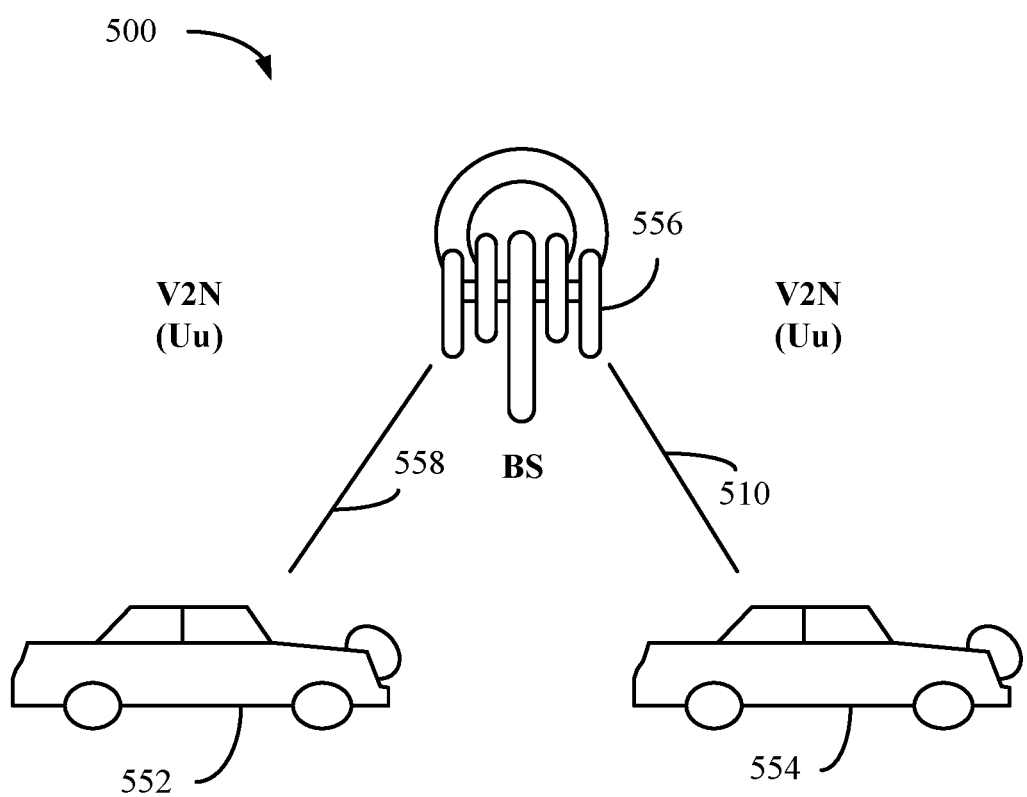
FIG. 5 illustrates an example V2X communication system, in accordance with certain aspects of the present disclosure.

FIG. 4 and FIG. 5 show diagrammatic representations of example V2X systems, in accordance with some aspects of the present disclosure. For example, the vehicles shown in FIG. 4 and FIG. 5 may communicate via sidelink channels and may perform sidelink CSI reporting as described herein.

The V2X systems, provided in FIG. 4 and FIG. 5 provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 550 for communication between a vehicle 552 and a vehicle 554 through a network entity 556. These network communications may occur through discrete nodes, such as a BS, that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

As mentioned above, aspects of the present disclosure relate to techniques for coordinated power savings for an access link and sidelinks.

Figure 6:
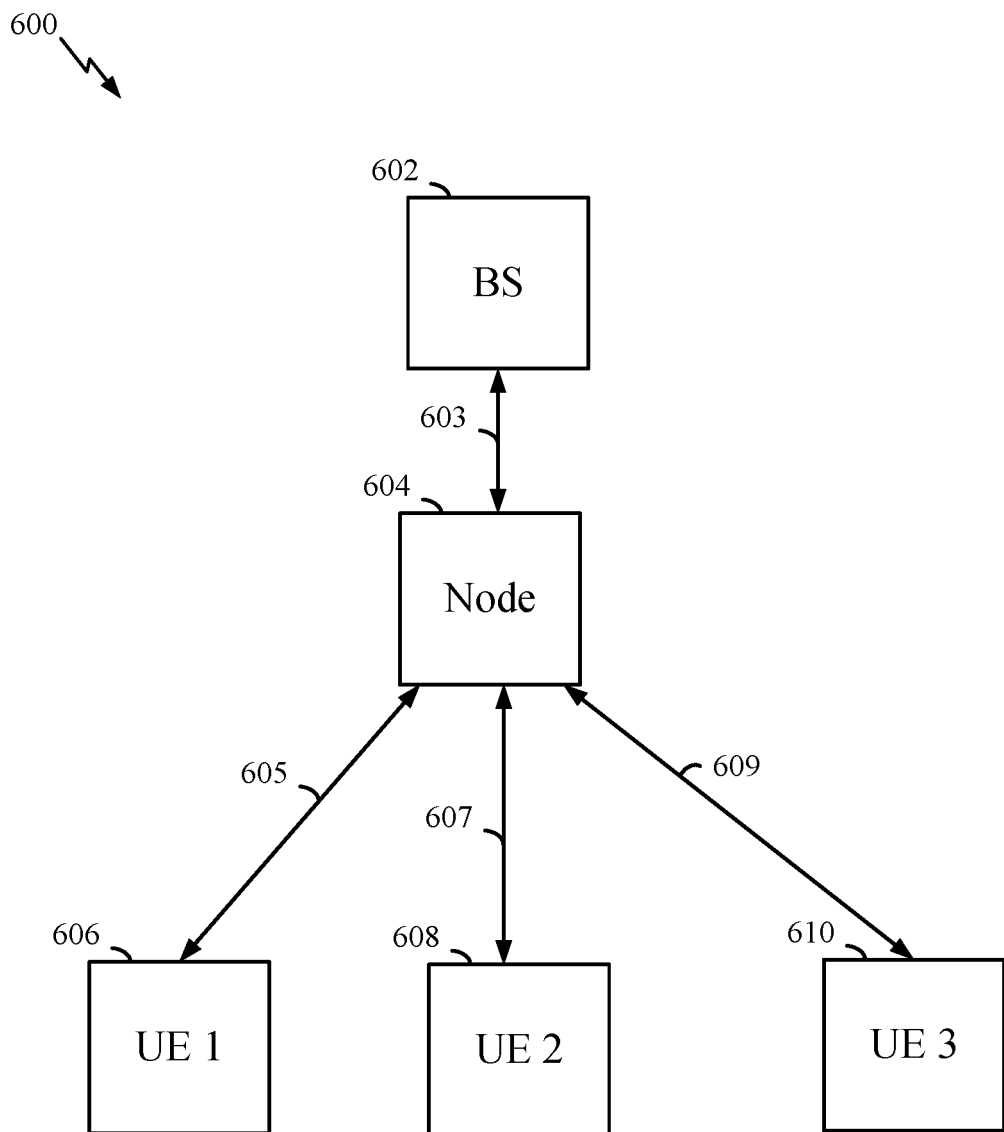
FIG. 6 is a diagram illustrating an example node with concurrent access link and sidelinks, in accordance with certain aspects of the present disclosure.

FIG. 6 is a diagram illustrating an example wireless node with concurrent access link and sidelinks, in accordance with certain aspects of the present disclosure. As shown in FIG. 6, a wireless node 604 has an access link (e.g., via the uU interface) with a BS 602. The BS 602 may be a gNB. In some examples, the wireless node 604 is a UE. In some examples, the wireless node 604 and BS 602 are in a 5G NR wireless communication network. As shown in FIG. 6, the wireless node 604 also has sidelinks (e.g., via the PC5 interface(s)) with the UEs 606, 608, and 610. The wireless node 604 may forward transmissions from the UEs 606, 608, and/or 610 to the BS 602. The UEs 606, 608, and 610 may be out of coverage of the BS 602. The UEs 606, 608, and 610 may not have a direct connections or access link to the BS 602. The UEs 606, 608, and 610 may be referred to as remote UEs. Thus, the wireless node 604 may receive transmissions concurrently from the BS 602 over the access link and the UEs 606, 608, and/or 610 over the sidelinks.

A power savings configuration may be configured for the access link and/or sidelink(s). A wireless device may include baseband processing components, radio frequency (RF) Rx front end components (e.g., referred to as a receive (Rx) chain), and RF Tx front end components (e.g., referred to as a transmit (Tx) chain). A power savings configuration may allow the wireless device to power off one or more of these RF components when not in use in order to save power. In some examples, a power savings configuration may use a wake-up signal. In some examples, a power savings configuration may use discontinuous reception (DRX) cycles.

Figure 7A:
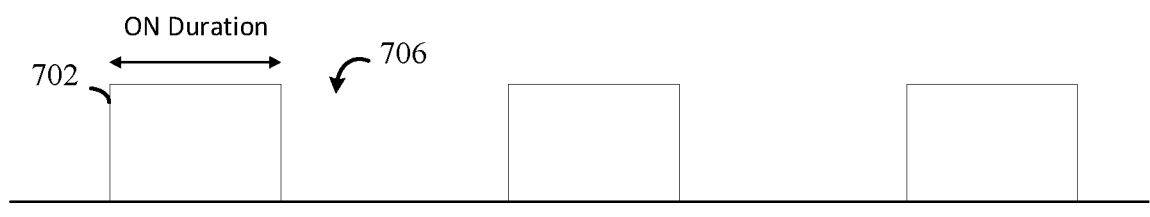
FIG. 7A is a diagram illustrating an example discontinuous reception (DRX) cycle, in accordance with certain aspects of the present disclosure.
Figure 7B:
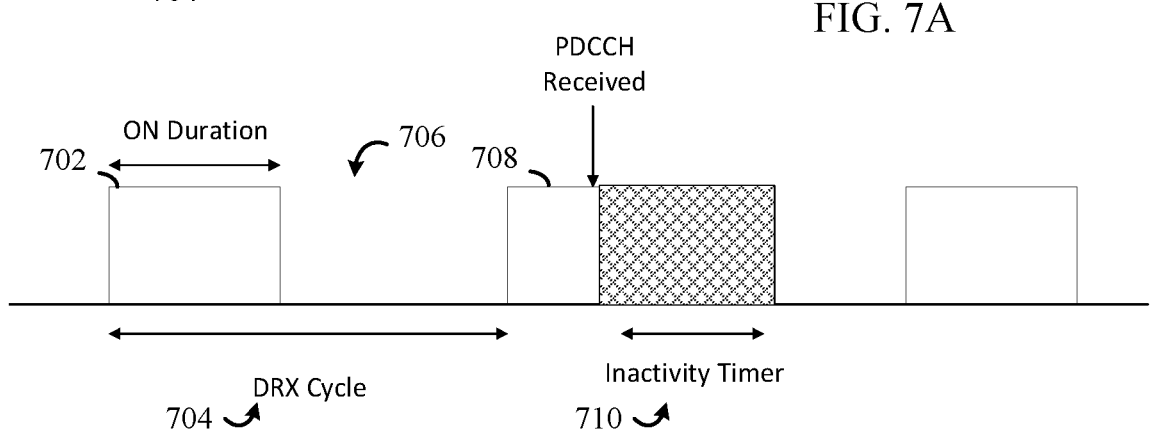
FIG. 7B is a diagram illustrating example control channel reception during a DRX ON duration, in accordance with certain aspects of the present disclosure.
Figure 8:
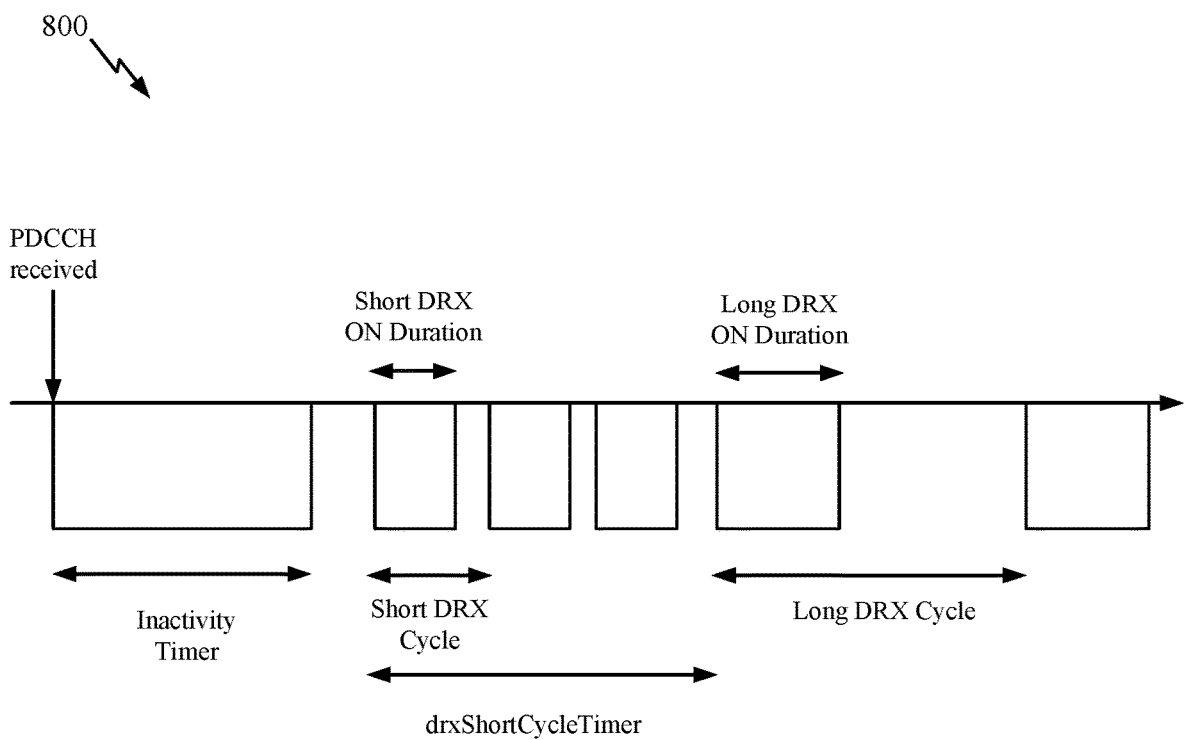
FIG. 8 is a diagram illustrating example configured long and short DRX cycles, in accordance with certain aspects of the present disclosure.

When DRX is configured, the wireless device cycles through ON periods (e.g., ON durations) and OFF periods (e.g., OFF durations) to save power. When the wireless device is in the DRX OFF state, the wireless device stops monitoring transmissions (e.g., PDCCH on the access link and/or PSCCH on the sidelink) and, therefore, does not process any downlink or sidelink data. FIG. 7 is a diagram illustrating an example DRX cycle, in accordance with certain aspects of the present disclosure. As shown in FIG. 7A, a DRX cycle 704 includes an ON duration 702 and an OFF duration 706. As shown in FIG. 7B, when a PDCCH is received in an ON duration 708, the wireless device may start a DRX inactivity timer that indicates a duration 710 the wireless device should remain ON and monitor for transmissions. If another transmission is received, the wireless device may restart the DRX inactivity timer. Once the timer expires, the wireless device goes to sleep. FIG. 8 is a diagram illustrating example configured long and short DRX cycles, in accordance with certain aspects of the present disclosure. As shown in FIG. 8, the long DRX cycle may include a longer ON durations and OFF durations than the short DRX cycle.

As discussed above, a wireless node may have concurrent access link and sidelink connections. The access link and sidelink(s) may each have a separate power saving configuration. If the power savings configurations are independently configured for the access link and sidelink(s) (e.g., in an uncoordinated manner), then the wake ups for the device with concurrent access link and sidelink(s) may be inefficient. Further, the sidelink UEs (e.g., remote UEs) may be out of coverage and not under direct control of the BS. Thus, the BS may know very little about those remote UEs. For example, the BS may not be aware of the traffic patterns, scheduling, etc., of those remote UEs. Therefore, the power savings configurations for the access link and sidelink(s) may be uncoordinated and may not be efficient.

Figure 9:
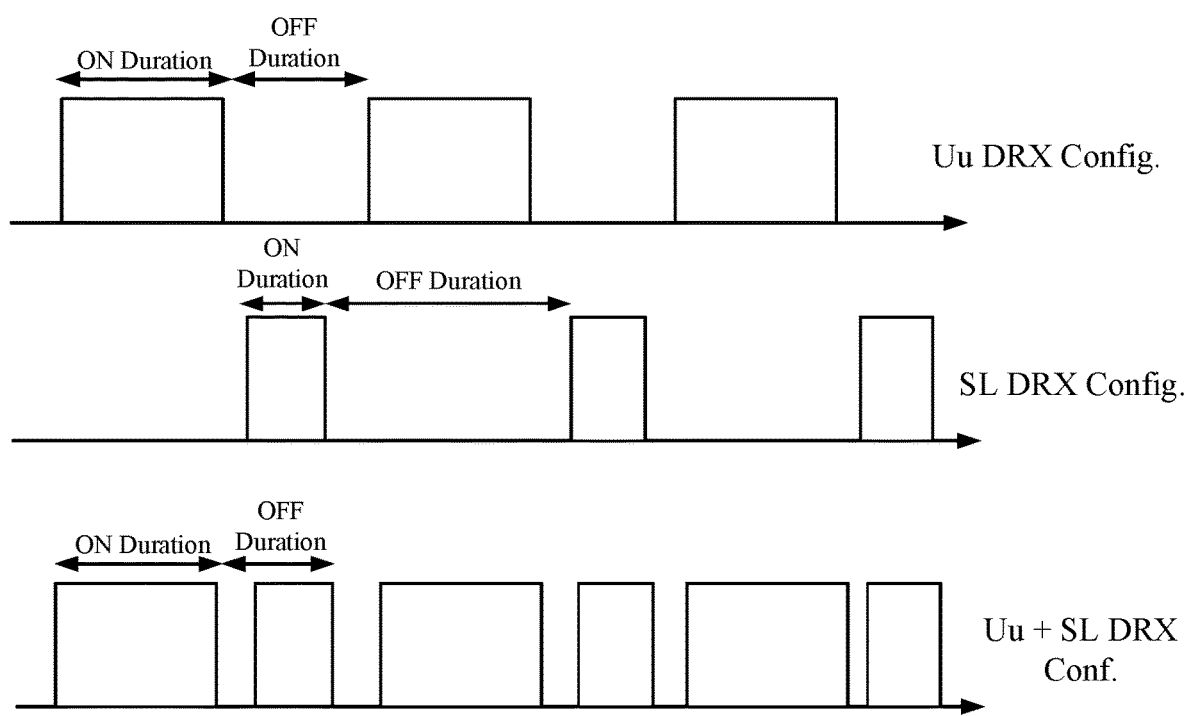
FIG. 9 is a diagram illustrating example wakes up for a wireless node configured with independent access link and sidelink DRX cycles, in accordance with certain aspects of the present disclosure.

As shown in FIG. 9, a wireless device may have a first DRX configuration (e.g., the Uu DRX configuration) for monitoring on the access link (e.g., PDCCH monitoring) and a second DRX configuration (e.g., the SL DRX configuration) for monitoring on a sidelink (e.g., PSCCH monitoring). The wireless device may have at least an Rx RF chain powered on for the monitoring. The wireless device may monitor PDCCH in a first set of slots and monitor PSCCH in a second set of slots. As shown in FIG. 9, the wireless device may frequently wake up due to wake ups for the access link power savings configuration (e.g., uU DRX ON periods) and the wakeups for the sidelink (e.g., SL-DRX ON periods). Thus, the wireless device may realize little power savings and few or none long sleep cycles (e.g., as seen in the Uu+SL DRX configuration). Further, powering on and power off RF components requires a power-on and power-off time to fully turn on or off. Therefore, toggling frequently between powered-on and powered-off is inefficient.

Accordingly, techniques and apparatus are desirable for power savings configurations for sidelink(s) and access link.

Example Coordinated Sidelink and Access Link Power Savings Configurations

Figure 10:
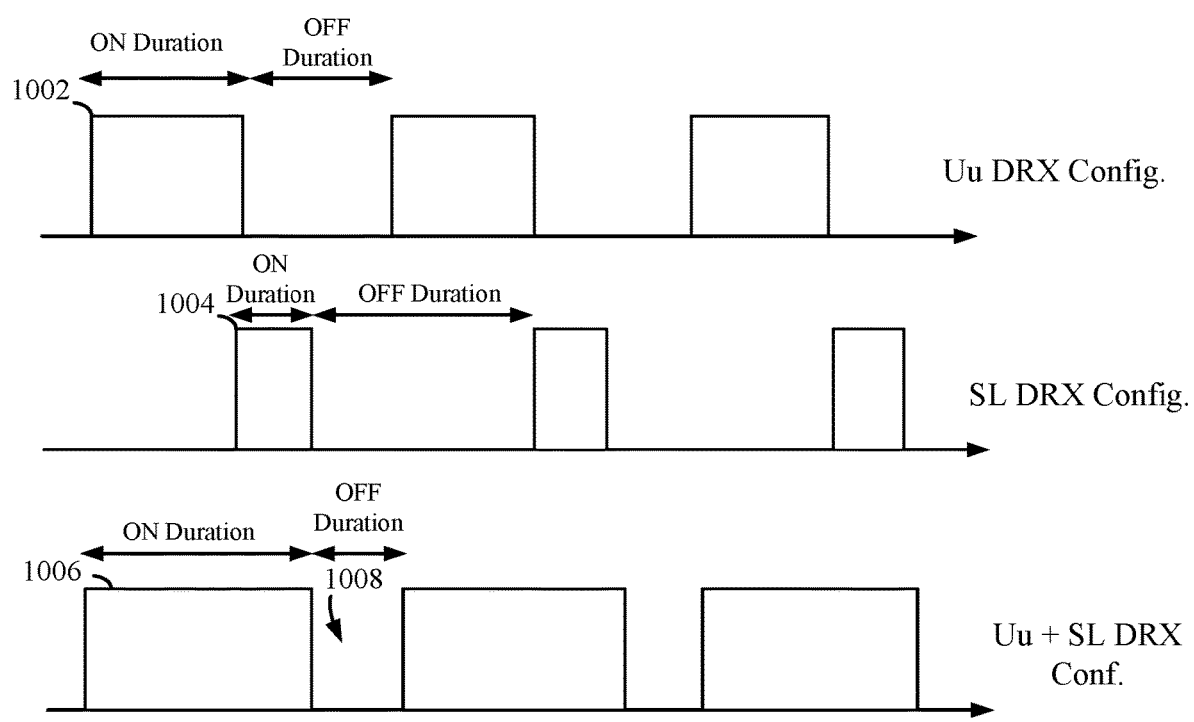
FIG. 10 is another diagram illustrating example wakes up for a wireless node configured with independent access link and sidelink DRX cycles, in accordance with certain aspects of the present disclosure.

In some examples, once a wireless node (e.g., a user equipment (UE) 120a in the wireless communication network 100) is powered on, it may be efficient for the wireless node to remain powered on for both access link and sidelink functions, such as to receive downlink and sidelink communications before going to sleep (e.g., powering off or partially power off). Thus, a power savings configuration for the access link may be coordinated with a power savings configuration for a sidelink, such that powered-on periods for the access link overlap or are adjacent (or nearly adjacent) to powered-on periods for the sidelink. As shown in FIG. 10, if the ON durations (1002) for the Uu DRX configuration are adjacent to the ON durations (1004) for the SL DRX configuration, then then the wireless node can remain awake for a single longer effective ON duration (1006) and can then make use of an OFF duration (1008) to save power. Similarly, although not shown, if the ON durations for the Uu DRX configuration are adjacent to the ON durations for the SL DRX configuration, then then the wireless node can remain awake for a single effective ON duration. Further, although not shown, if the ON durations for the Uu DRX configuration are nearly adjacent (e.g., within a threshold offset duration) to the ON durations for the SL DRX configuration, then then the wireless node can remain awake after ON duration for the Uu DRX configuration until the ON duration for the SL DRX configuration, for a single longer effective ON duration. Further still, although FIG. 10 shows coordination between an access link and a single sidelink DRX configuration, coordination may be between the access link and multiple sidelink DRX configurations.

According to certain aspects of the disclosure, the base station (BS) and/or the wireless node may coordinate the access link and sidelink(s) power savings configurations. For example, the BS can determine and configure the access link power savings configuration. The remote UEs may provide information that may be used for determining the sidelink and/or the access link power savings configuration(s). In some examples, the wireless node can forward the information to the BS and the BS can use the information to determine and configure both the access link and sidelink power savings configuration(s). In some examples, the BS provides the access link power savings configuration to the wireless node and the wireless node determines the sidelink power savings configuration(s) based on the power savings configuration for the access link provided by the BS and the information received from the remote UEs on the sidelink(s). In some examples, the power savings configuration may be a discontinuous reception (DRX) cycle configuration, a wake-up signal configuration, or other power savings configuration.

According to certain aspects, the information provided by the remote UEs to the wireless node over the sidelink (e.g., via PC5) is a proposed sidelink power savings configuration. In some examples, the information provided by the remote UEs is information that can be used for determining the sidelink power savings configuration. For example, the information may include traffic patterns of the remote UE, a quality-of-service (QoS) for the sidelink, or other information. In some examples, the information provided by the remote UEs may be a partial list of parameters for a power savings configuration (e.g., a desired duty-cycle for DRX ON-OFF periods).

In an illustrative example, a wireless node (e.g., a UE) receives a proposed sidelink DRX configuration from a remote UE via a sidelink channel. The wireless node forwards the proposed sidelink DRX configuration to the gNB over the access link. The gNB selects (e.g., determines) coordinated access link and sidelink DRX configurations and sends the selected coordinated access link and sidelink DRX configurations to the wireless node. The wireless node may then forward the sidelink DRX configuration to the remote UE. The wireless node subsequently follows the coordinated access link and sidelink DRX configurations. For example, the wireless node follows the configured ON durations for the access link DRX configuration to monitor the physical downlink control channel (PDCCH) and the wireless node follows the configured ON durations for the sidelink DRX configuration to monitor the physical sidelink control channel (PSCCH). In some examples, the wireless node monitors both the PDCCH and the PSCCH during a coordinated ON duration.

In another illustrative example, the wireless node receives the proposed sidelink DRX configuration from the remote UE via the sidelink channel and the wireless node receives the access link DRX configuration from the gNB over the access link. The wireless node determines a new sidelink DRX configurations based on the proposed sidelink DRX configuration from the remote UE and the access link DRX configuration from the gNB. The wireless node then follows the determined new sidelink DRX configuration for the sidelink and follows the access link DRX configuration from the gNB for the access link. The wireless node may provide the new sidelink DRX configuration to the remote UE and the gNB.

Figure 11:
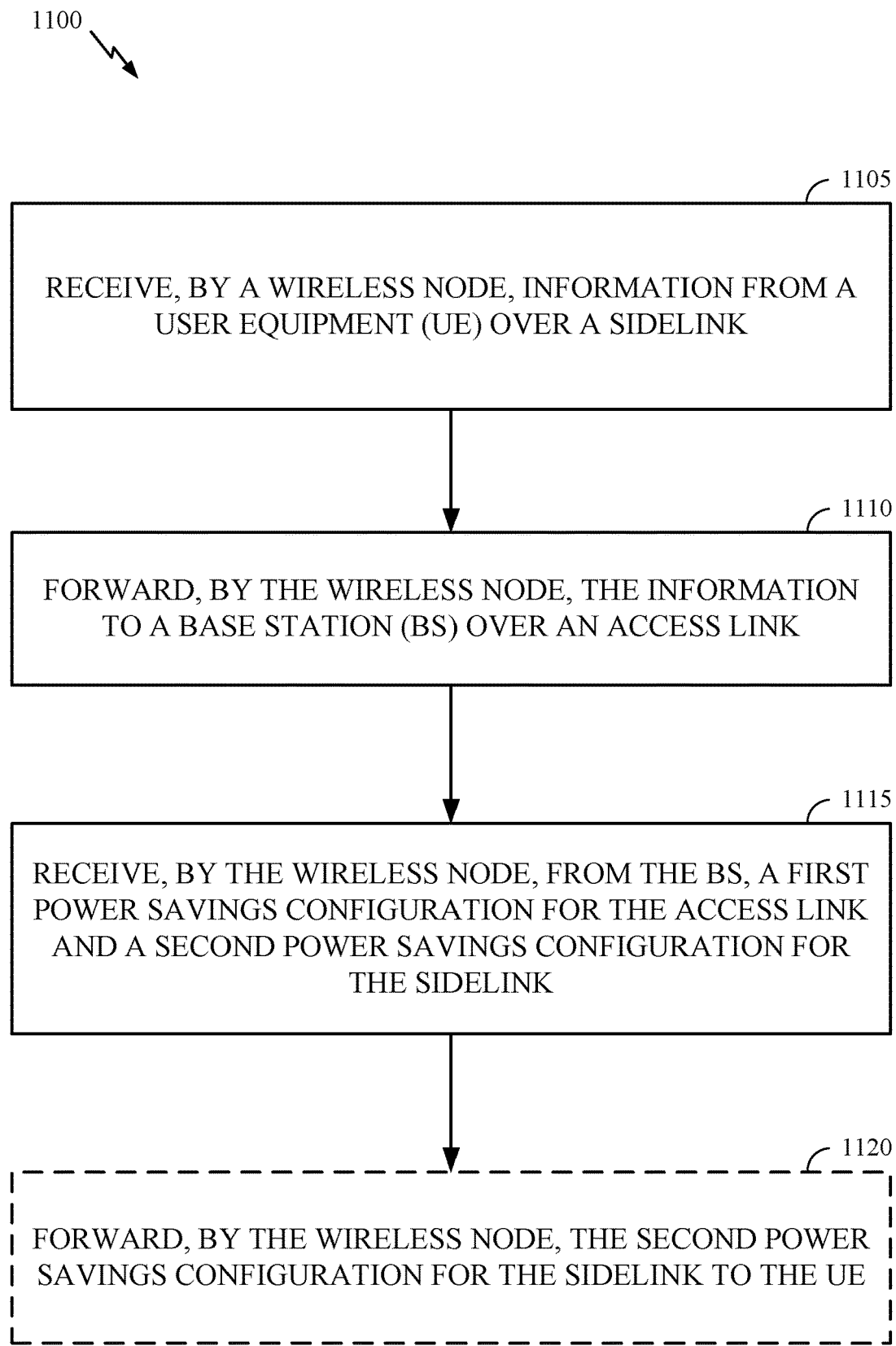
FIG. 11 is a flow diagram illustrating example operations for wireless communication by a wireless node, in accordance with aspects of the present disclosure.

FIG. 11 is a flow diagram illustrating example operations 1100 for wireless communication, in accordance with certain aspects of the present disclosure. The operations 1100 may be performed, for example, by a wireless node (e.g., such as a UE 120a in the wireless communication network 100). Operations 1100 may be implemented as software components that are executed and run on one or more processors (e.g., controller/processor 280 of FIG. 2). Further, the transmission and reception of signals by the wireless node in operations 1100 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

Operations 1100 may begin, at 1105, by receiving information from a UE over a sidelink. The information from the UE over the sidelink may be a proposed power savings configuration for the sidelink. The information may be one or more traffic patterns of the UE, scheduling information of the UE, QoS targets of the UE, a subset of one or more power savings parameters, or a combination thereof. The partial subset of one or more power savings parameters may be a requested duty cycle of active periods and sleep periods.

At 1110, the wireless node forwards the information to a BS over an access link.

At 1115, the wireless node receives, from the BS, a first power savings configuration for the access link and a second power savings configuration for the sidelink. The first power savings configuration and the second power savings configuration may be DRX configurations. The first power savings configuration and the second power savings configuration may be based, at least in part, on the information.

Optionally, at 1120, the wireless node may forward the second power savings configuration for the sidelink to the UE.

Figure 12:
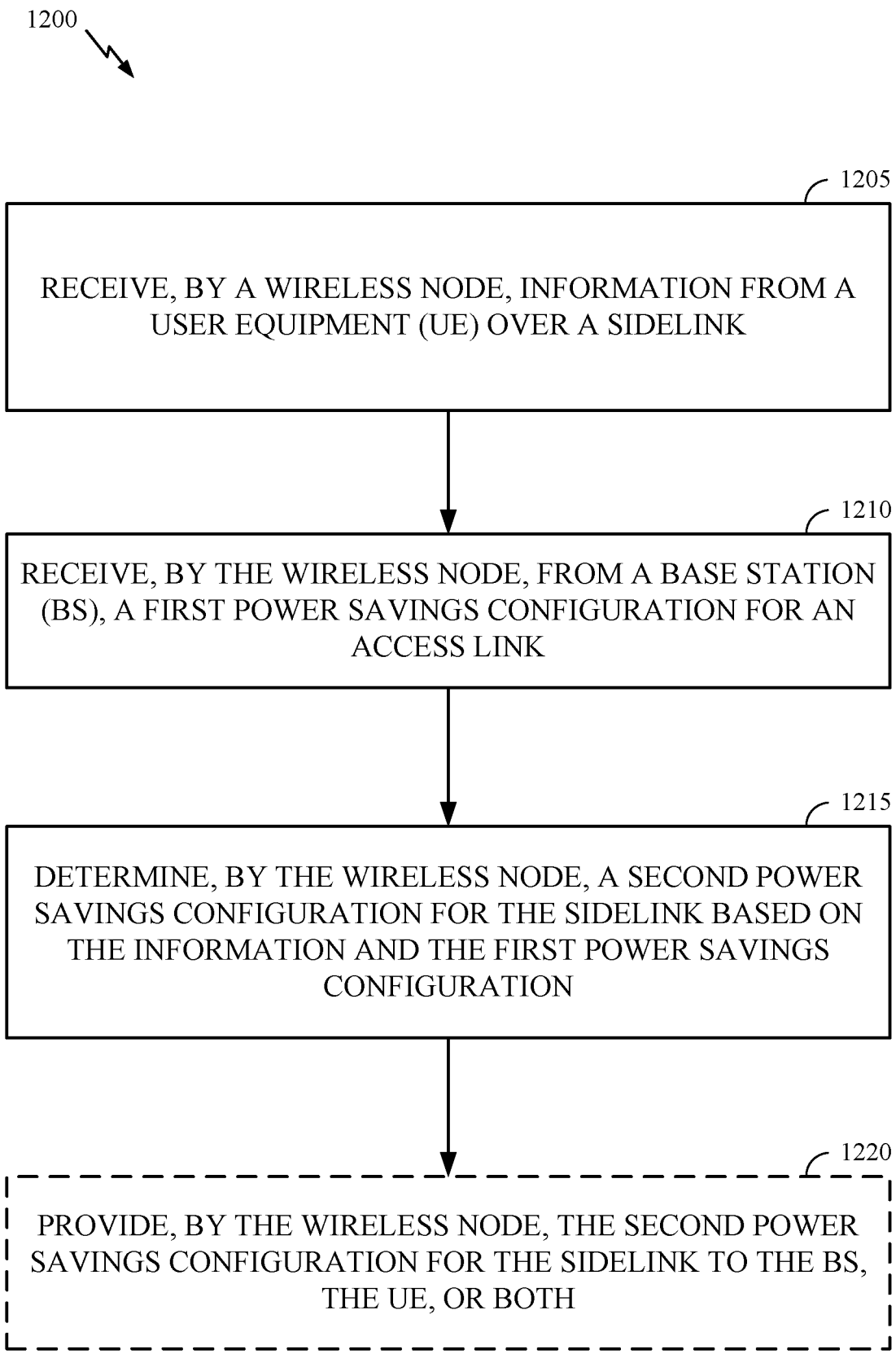
FIG. 12 is a flow diagram illustrating example operations for wireless communication by a wireless node, in accordance with aspects of the present disclosure.

FIG. 12 is a flow diagram illustrating example operations 1200 for wireless communication, in accordance with certain aspects of the present disclosure. The operations 1200 may be performed, for example, by a wireless node (e.g., such as a UE 120a in the wireless communication network 100). Operations 1200 may be implemented as software components that are executed and run on one or more processors (e.g., controller/processor 280 of FIG. 2). Further, the transmission and reception of signals by the wireless node in operations 1200 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

Operations 1200 may begin, at 1205, by receiving information from a UE over a sidelink. The information from the UE over the sidelink may be a proposed power savings configuration for the sidelink. The information may be one or more traffic patterns of the UE, scheduling information of the UE, QoS targets of the UE, a subset of one or more power savings parameters, or a combination thereof. The partial subset of one or more power savings parameters may be a requested duty cycle of active periods and sleep periods.

At 1210, the wireless node receives, from a BS, a first power savings configuration for an access link.

At 1215, the wireless node determines a second power savings configuration for the sidelink based on the information and the first power savings configuration.

The wireless node may apply the first power savings configuration for the access and applying the second power savings configuration for the sidelink. Optionally, at 1220, the wireless node may provide the second power savings configuration to the BS and the UE. The first power savings configuration and the second power savings configuration may be DRX configurations.

Figure 13:
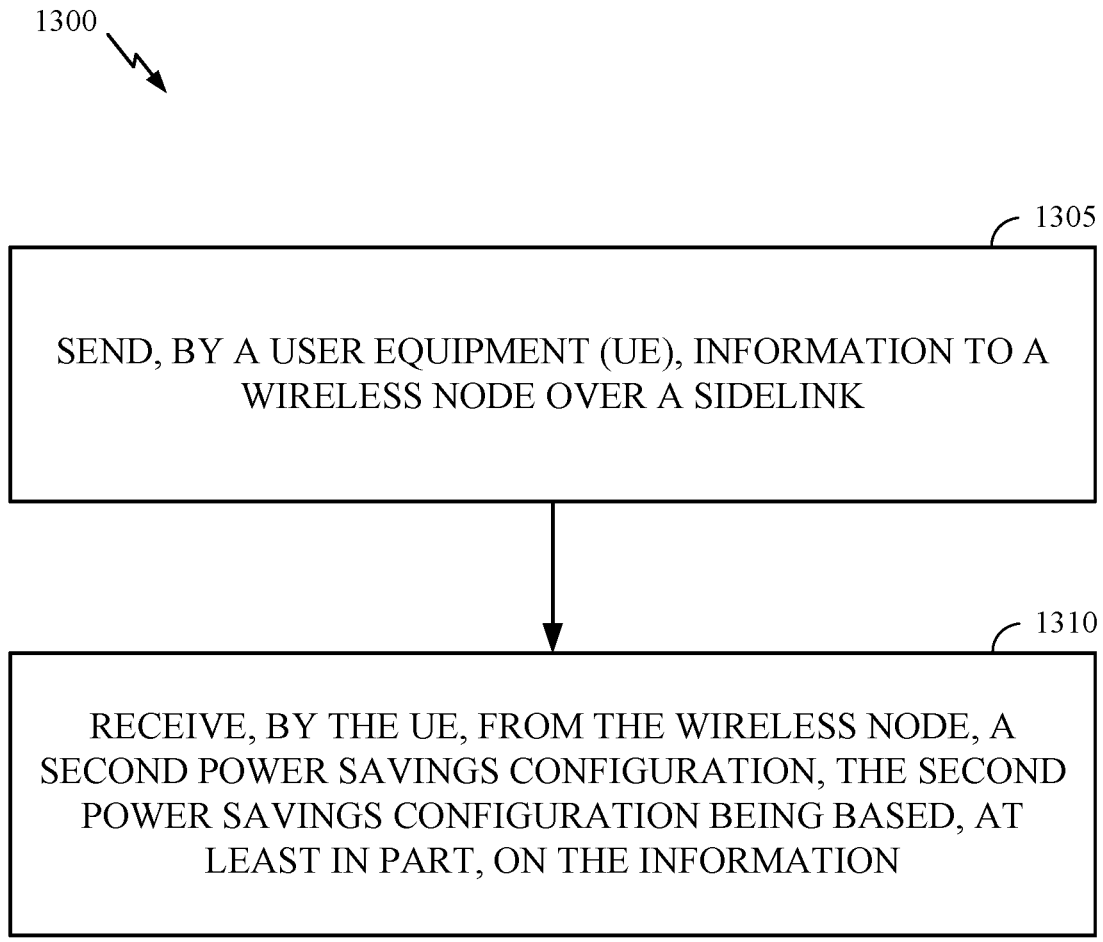
FIG. 13 is a flow diagram illustrating example operations for wireless communication by a UE, in accordance with aspects of the present disclosure.

FIG. 13 is a flow diagram illustrating example operations 1300 for wireless communication, in accordance with certain aspects of the present disclosure. The operations 1300 may be performed, for example, by a remote UE (e.g., such as a UE 120b in the wireless communication network 100). Operations 1300 may be implemented as software components that are executed and run on one or more processors (e.g., controller/processor 280 of FIG. 2). Further, the transmission and reception of signals by the remote UE in operations 1100 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280) obtaining and/or outputting signals.

Operations 1300 may begin, at 1305, by sending information to a wireless node over a sidelink. The information may be a proposed power savings configuration for the sidelink. The information may be one or more traffic patterns of the UE, scheduling information of the UE, QoS targets of the UE, a subset of one or more power savings parameters, or a combination thereof. The partial subset of one or more power savings parameters may be a requested duty cycle of active periods and sleep periods.

At 1310, the UE receives, from the wireless node, a second power savings configuration for the sidelink. The second power savings configuration is based, at least in part, on the information. The second power savings configuration may be further based on a first power savings configuration for an access link between the wireless node and a BS. The first power savings configuration and the second power savings configuration may be DRX configurations.

Figure 14:
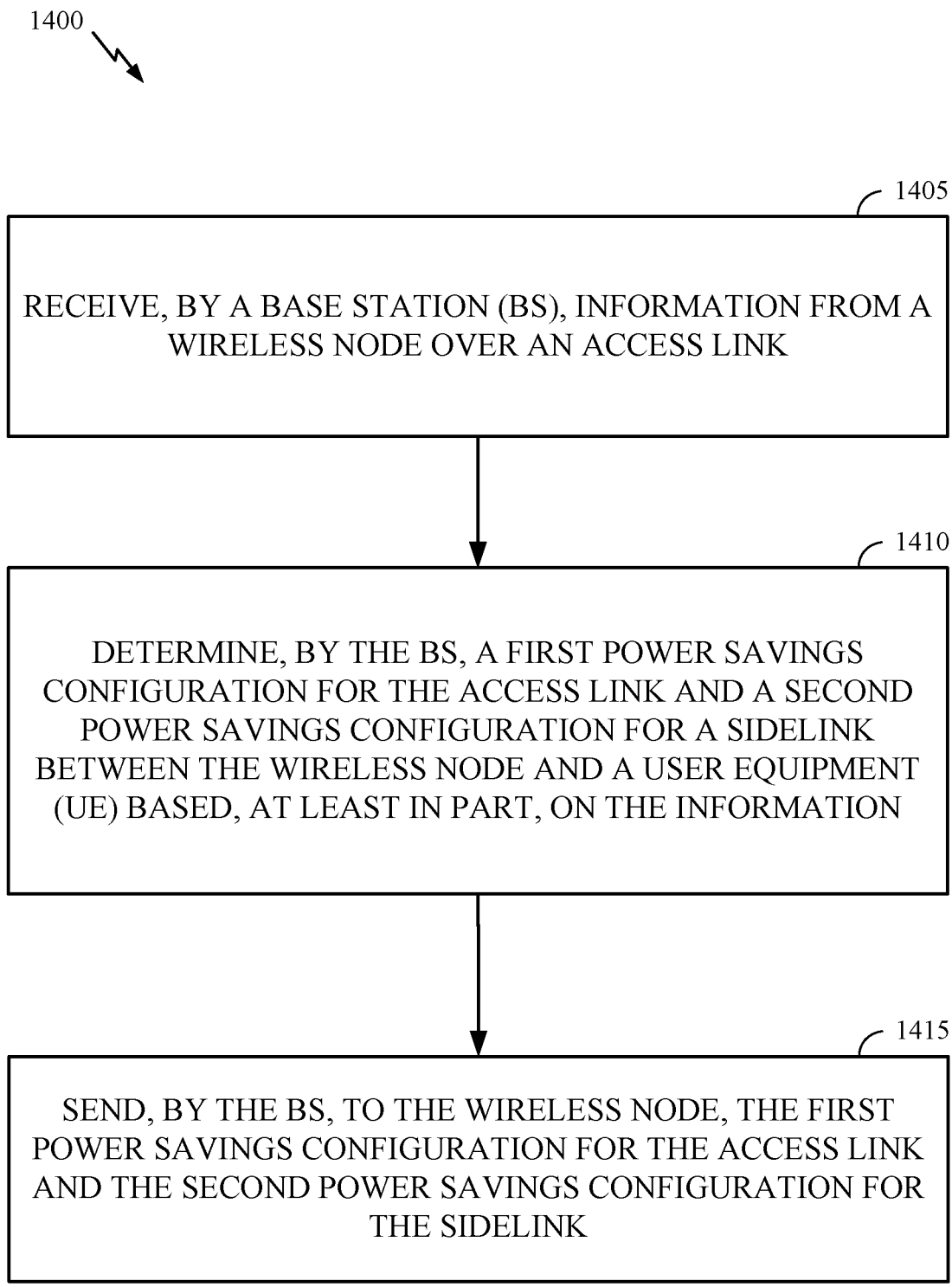
FIG. 14 is a flow diagram illustrating example operations for wireless communication by a BS, in accordance with aspects of the present disclosure.

FIG. 14 is a flow diagram illustrating example operations 1400 for wireless communication, in accordance with certain aspects of the present disclosure. The operations 1400 may be performed, for example, by a BS (e.g., the BS 110a in the wireless communication network 100). Operations 1400 may be implemented as software components that are executed and run on one or more processors (e.g., controller/processor 240 of FIG. 2). Further, the transmission and reception of signals by the BS in operations 1400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1400 may begin, at 1405, by receiving information from a wireless node over an access link. The information may be information from the UE forwarded to the BS by the wireless node. The information from the wireless node may be a power savings configuration for the sidelink proposed by the UE. The information may be one or more traffic patterns of the UE, scheduling information of the UE, QoS targets of the UE, a subset of one or more power savings parameters, or a combination thereof. The partial subset of one or more power savings parameters may be a requested duty cycle of active periods and sleep periods.

At 1410, the BS determines a first power savings configuration for the access link and a second power savings configuration for a sidelink between the wireless node and a UE based, at least in part, on the information. The first power savings configuration and the second power savings configuration may be DRX configurations.

At 1415, the BS sends, to the wireless node, the first power savings configuration for the access link and the second power savings configuration for the sidelink.

Figure 15:
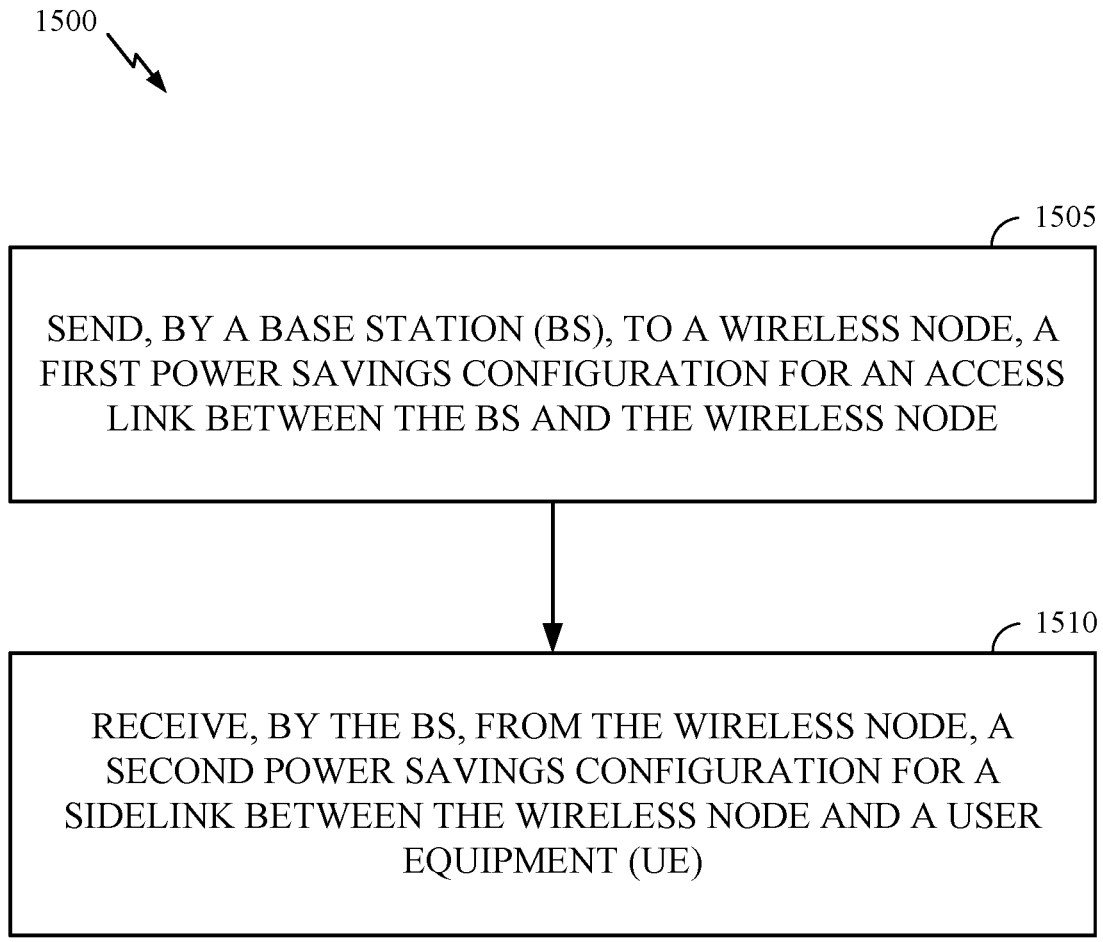
FIG. 15 is a flow diagram illustrating example operations for wireless communication by a BS, in accordance with aspects of the present disclosure.

FIG. 15 is a flow diagram illustrating example operations 1500 for wireless communication, in accordance with certain aspects of the present disclosure. The operations 1500 may be performed, for example, by a BS (e.g., the BS 110a in the wireless communication network 100). Operations 1500 may be implemented as software components that are executed and run on one or more processors (e.g., controller/processor 240 of FIG. 2). Further, the transmission and reception of signals by the BS in operations 1500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1500 may begin, at 1505, by sending, to a wireless node, a first power savings configuration for an access link between the BS and the wireless node.

At 1510, the BS receives, from the wireless node, a second power savings configuration for a sidelink between the wireless node and a UE. The first power savings configuration and the second power savings configuration may be DRX configurations. The second power savings configuration may be based on information from the UE. The information from the UE over the sidelink may be a proposed power savings configuration for the sidelink. The information may be one or more traffic patterns of the UE, scheduling information of the UE, QoS targets of the UE, a subset of one or more power savings parameters, or a combination thereof. The partial subset of one or more power savings parameters may be a requested duty cycle of active periods and sleep periods.

Figure 16:
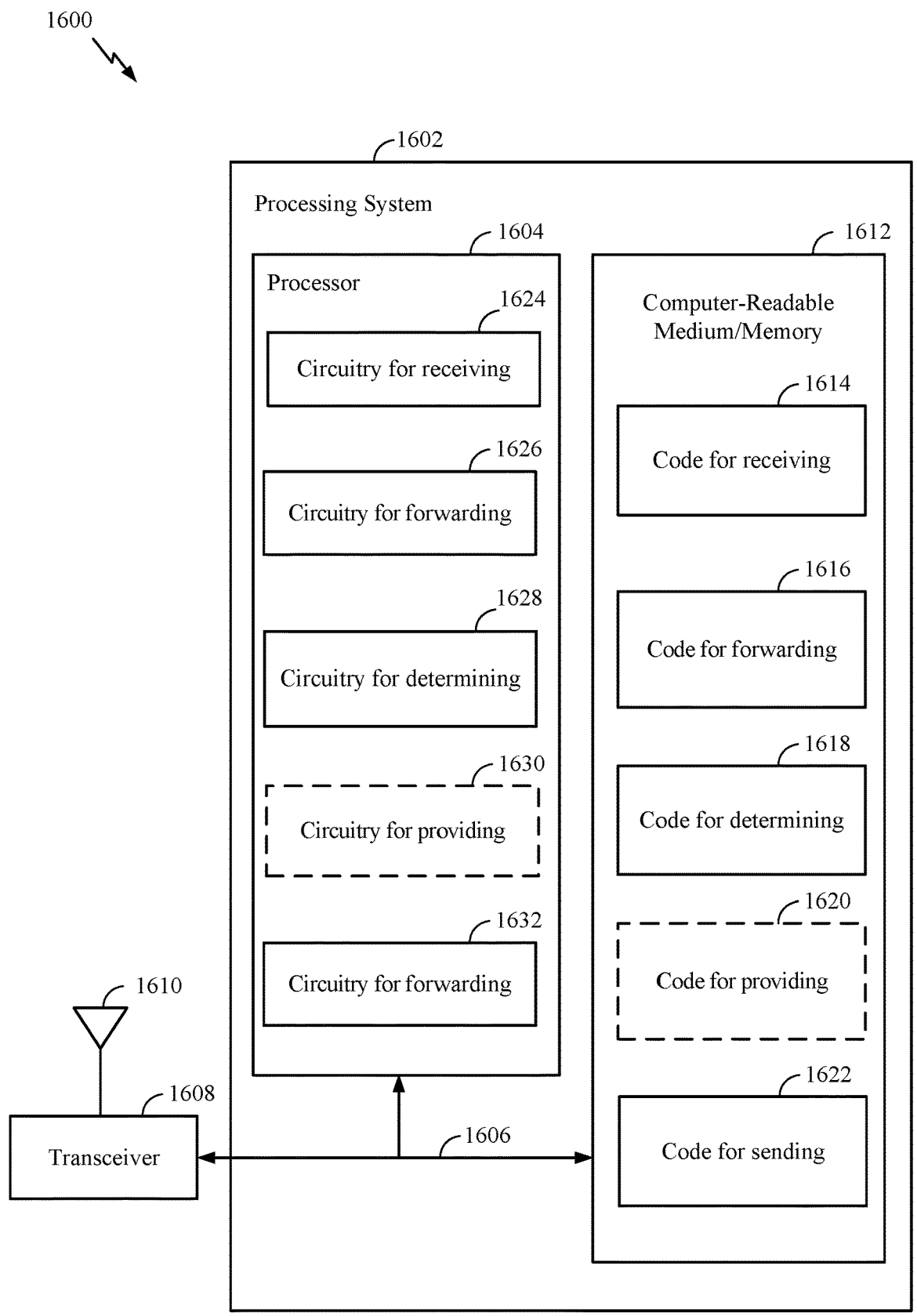
FIG. 16 illustrates an example communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 11, FIG. 12, and/or FIG. 13. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 11, FIG. 12, and/or FIG. 13, or other operations for performing the various techniques discussed herein for coordinated access link and sidelink(s) power savings configurations. In certain aspects, computer-readable medium/memory 1612 stores code 1614 for receiving; code 1616 for forwarding; code 1618 for determining; code 1620 for providing; and/or code 1622 for sending. In certain aspects, the processor 1604 has circuitry configured to implement the code stored in the computer-readable medium/memory 1612. The processor 1604 includes circuitry 1624 for receiving; circuitry 1626 for forwarding; circuitry 1628 for determining; circuitry 1630 for providing; and/or circuitry 1632 for forwarding.

Figure 17:
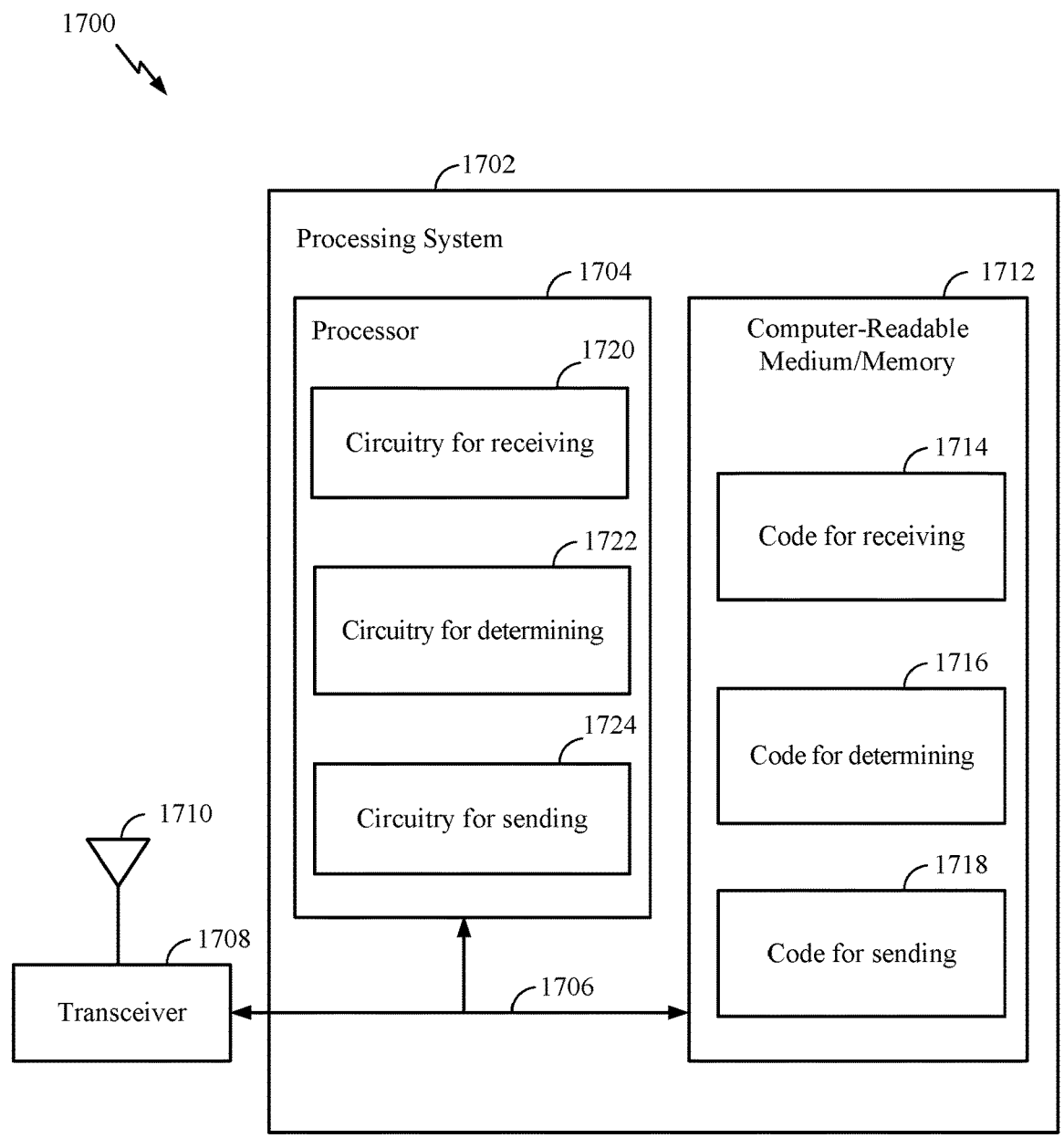
FIG. 17 illustrates an example communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 14 and/or FIG. 15. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 14 and/or FIG. 15, or other operations for performing the various techniques discussed herein for coordinated access link and sidelink(s) power savings configurations. In certain aspects, computer-readable medium/memory 1712 stores code 1714 for receiving; code 1716 for determining; and/or code 1718 for sending. In certain aspects, the processor 1704 has circuitry configured to implement the code stored in the computer-readable medium/memory 1712. The processor 1704 includes circuitry 1720 for receiving; circuitry 1722 for determining; and/or circuitry 1724 for sending.

Example Aspects

Implementation examples are described in the following numbered clauses:

1. A method for wireless communication by a wireless node, comprising: receiving information from a user equipment (UE) over a sidelink; forwarding the information to a base station (BS) over an access link; and receiving, from the BS, a first power savings configuration for the access link and a second power savings configuration for the sidelink.

2. The method of aspect 1, wherein the first power savings configuration and the second power savings configuration comprise discontinuous reception (DRX) configurations.

3. The method any of aspect 1 and 2, wherein the information from the UE over the sidelink comprises a proposed power savings configuration for the sidelink.

4. The method of any of aspect 1-3, wherein the information from the UE over the sidelink comprises one or more traffic patterns of the UE.

5. The method of any of aspect 1-4, wherein the information from the UE over the sidelink comprises scheduling information of the UE.

6. The method of any of aspects 1-5, wherein the information from the UE over the sidelink comprises one or more quality-of-service (QoS) targets of the UE.

7. The method of any of aspects 1-6, wherein the information from the UE over the sidelink comprises a subset of one or more power savings parameters.

8. The method of aspect 7, wherein the subset of one or more power savings parameters comprises a requested duty cycle of active periods and sleep periods.

9. The method of any of aspects 1-8, wherein the first power savings configuration and the second power savings configuration are based, at least in part, on the information from the UE.

10. The method of any of aspects 1-9, further comprising forwarding the second power savings configuration for the sidelink to the UE.

11. A method for wireless communication by a wireless node, comprising: receiving information from a user equipment (UE) over a sidelink; receiving, from a base station (BS), a first power savings configuration for an access link; and determining a second power savings configuration for the sidelink based on the information and the first power savings configuration.

12. The method of aspect 11, further comprising applying the first power savings configuration for the access link and applying the second power savings configuration for the sidelink.

13. The method of any of aspects 11 and 12, further comprising providing the second power savings configuration for the sidelink to the BS, the UE, or both.

14. The method of any of aspects 11-13, wherein the first power savings configuration and the second power savings configuration comprise discontinuous reception (DRX) configurations.

15. The method of any of aspects 11-14, wherein the information from the UE over the sidelink comprises a proposed power savings configuration for the sidelink.

16. The method of any of aspects 11-15, wherein the information from the UE comprises one or more traffic patterns of the UE, scheduling information of the UE, one or more quality-of-service (QoS) targets of the UE, a subset of one or more power savings parameters, or a combination thereof.

17. The method of aspect 16, wherein the subset of one or more power savings parameters comprises a requested duty cycle of active periods and sleep periods.

18. A method for wireless communication by a base station (BS), comprising: receiving information from a wireless node over an access link; determining a first power savings configuration for the access link and a second power savings configuration for a sidelink between the wireless node and a user equipment (UE) based, at least in part, on the information; and sending, to the wireless node, the first power savings configuration for the access link and the second power savings configuration for the sidelink.

19. The method of aspect 18, wherein the information comprises information from the UE forwarded to the BS by the wireless node.

20. The method of any of aspects 18 and 19, wherein the first power savings configuration and the second power savings configuration comprise discontinuous reception (DRX) configurations.

21. The method of any of aspects 18-20, wherein the information from the wireless node comprises a power savings configuration for the sidelink proposed by the UE.

22. The method of any of aspects 18-21, wherein the information comprises one or more traffic patterns of the UE, scheduling information of the UE, one or more quality-of-service (QoS) targets of the UE, a subset of one or more power savings parameters, or a combination thereof.

23. The method of any of aspects 22, wherein the subset of one or more power savings parameters comprises a requested duty cycle of active periods and sleep periods.

24. A method for wireless communication by a base station (BS), comprising: sending, to a wireless node, a first power savings configuration for an access link between the BS and the wireless node; and receiving, from the wireless node, a second power savings configuration for a sidelink between the wireless node and a user equipment (UE).

25. The method of aspect 24, wherein the first power savings configuration and the second power savings configuration comprise discontinuous reception (DRX) configurations.

26. The method of any of aspects 24 and 25, wherein the second power savings configuration is based on information from the UE.

27. The method of any of aspect 26, wherein the information from the UE comprises a proposed power savings configuration for the sidelink.

28. The method of any of aspects 26 and 27, wherein the information comprises one or more traffic patterns of the UE, scheduling information of the UE, one or more quality-of-service (QoS) targets of the UE, or a combination thereof.

29. The method of any of aspects 26-28, wherein the information comprises a subset of one or more power savings parameters.

30. The method of aspect 29, wherein the subset of one or more power savings parameters comprises a requested duty cycle of active periods and sleep periods.

31. An apparatus comprising means for performing the method of any of aspects 1 through 30.

32. An apparatus comprising at least one processor and a memory coupled to the at least one processor, the memory comprising code executable by the at least one processor to cause the apparatus to perform the method of any of aspects 1 through 30.

33. A computer readable medium storing computer executable code thereon for wireless communications that, when executed by at least one processor, cause an apparatus to perform the method of any of aspects 1 through 30.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 11-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a wireless node, comprising:
   receiving information from a user equipment (UE) over a sidelink;
   forwarding, to a network entity over an access link, a proposed sidelink power savings configuration for the sidelink based on the information from the UE, wherein the proposed sidelink power savings configuration comprises a first one or more wake periods and a first one or more sleep periods; and
   receiving, from the network entity, a power savings configuration for the access link and a coordinated sidelink power savings configuration for the sidelink, wherein:
   the power savings configuration for the access link comprises a second one or more wake periods and a second one or more sleep periods;
   the coordinated sidelink power savings configuration comprises a third one or more wake periods, adjacent to the second one or more wake periods, and a third one or more sleep periods; and
   the third one or more wake periods adjacent to the second one or more wake periods comprises each third wake period of a plurality of third wake periods being adjacent to a second wake period of a plurality of second wake periods.

2. The method of claim 1, wherein the proposed sidelink power savings configuration for the sidelink, the power savings configuration for the access link, and the coordinated sidelink power savings configuration each comprises a discontinuous reception (DRX) configuration.

3. The method of claim 1, wherein the information from the UE over the sidelink comprises the proposed sidelink power savings configuration for the sidelink.

4. The method of claim 1, wherein the information from the UE over the sidelink comprises one or more traffic patterns of the UE.

5. The method of claim 1, wherein the information from the UE over the sidelink comprises scheduling information of the UE.

6. The method of claim 1, wherein the information from the UE over the sidelink comprises one or more quality-of-service (QoS) targets of the UE.

7. The method of claim 1, wherein the information from the UE over the sidelink comprises a subset of one or more power savings parameters.

8. The method of claim 7, wherein the subset of the one or more power savings parameters comprises a requested duty cycle of active periods and sleep periods.

9. The method of claim 1, further comprising forwarding the coordinated sidelink power savings configuration for the sidelink to the UE.

10. The method of claim 1, wherein the UE is out-of-coverage of the network entity.

11. A method for wireless communication by a wireless node, comprising:
   receiving information from a user equipment (UE) over a sidelink;
   receiving, from a network entity, a power savings configuration for an access link, wherein the power savings configuration for the access link comprises a first one or more wake periods and a first one or more sleep periods; and
   determining a coordinated sidelink power savings configuration for the sidelink based on the information and the power savings configuration for the access link, wherein:
      the coordinated power sidelink savings configuration for the sidelink comprises a second one or more wake periods, adjacent the first one or more wake periods, and a second one or more sleep periods, and
      the second one or more wake periods adjacent to the first one or more wake periods comprises each second wake period of a plurality of second wake periods being adjacent to a first wake period of a plurality of first wake periods.

12. The method of claim 11, further comprising applying the power savings configuration for the access link for communicating with the network entity on the access link and applying the coordinated sidelink power savings configuration for the sidelink for communicating with the UE on the sidelink.

13. The method of claim 11, further comprising providing the coordinated sidelink power savings configuration for the sidelink to the network entity, the UE, or both.

14. The method of claim 11, wherein the power savings configuration for the access link and the coordinated sidelink power savings configuration each comprises a discontinuous reception (DRX) configuration.

15. The method of claim 11, wherein the information from the UE over the sidelink comprises a proposed power savings configuration for the sidelink.

16. The method of claim 11, wherein the information from the UE comprises one or more traffic patterns of the UE, scheduling information of the UE, one or more quality-of-service (QoS) targets of the UE, a subset of one or more power savings parameters, or a combination thereof.

17. The method of claim 16, wherein the subset of the one or more power savings parameters comprises a requested duty cycle of active periods and sleep periods.

18. A method for wireless communication by a network entity, comprising:
   obtaining, from a wireless node over an access link, a proposed sidelink power savings configuration for a sidelink between the wireless node and a user equipment (UE), wherein the proposed sidelink power savings configuration comprises a first one or more wake periods and a first one or more sleep periods;
   determining a power savings configuration for the access link, wherein the power savings configuration for the access link comprises a second one or more wake periods and a second one or more sleep periods;
   determining a coordinated sidelink power savings configuration for the sidelink based, at least in part, on the proposed sidelink power savings configuration and the power savings configuration for the access link, wherein:
      the coordinated sidelink power savings configuration comprises a third one or more wake periods, adjacent to the second one or more wake periods, and a third one or more sleep periods; and
      the third one or more wake periods adjacent to the second one or more wake periods comprises each third wake period of a plurality of third wake periods being adjacent to a second wake period of a plurality of second wake periods; and
   outputting, to the wireless node, the power savings configuration for the access link and the coordinated sidelink power savings configuration for the sidelink.

19. The method of claim 18, wherein the coordinated sidelink power savings configuration is based on information from the UE to the wireless node.

20. The method of claim 19, wherein the information from the UE comprises one or more traffic patterns of the UE, scheduling information of the UE, one or more quality-of-service (QoS) targets of the UE, a subset of one or more power savings parameters, or a combination thereof.

21. The method of claim 20, wherein the subset of the one or more power savings parameters comprises a requested duty cycle of active periods and sleep periods.

22. The method of claim 18, wherein the proposed sidelink power savings configuration, the power savings configuration for the access link, and the coordinated sidelink power savings configuration each comprises a discontinuous reception (DRX) configuration.

23. A method for wireless communication by a network entity, comprising:
   outputting, to a wireless node, a first power savings configuration for an access link between the network entity and the wireless node, wherein the first power savings configuration for the access link comprises a first one or more wake periods and a first one or more sleep periods; and
   obtaining, from the wireless node, a second power savings configuration for a sidelink between the wireless node and a user equipment (UE), wherein:
      the second power savings configuration for the sidelink comprises a second one or more wake periods, adjacent the first one or more wake periods, and a second one or more sleep periods; and
      the second one or more wake periods adjacent to the first one or more wake periods comprises each second wake period of a plurality of second wake periods being adjacent to a first wake period of a plurality of first wake periods.

24. The method of claim 23, wherein the first power savings configuration and the second power savings configuration each comprises a discontinuous reception (DRX) configuration.

25. The method of claim 23, wherein the second power savings configuration is based on information from the UE.

26. The method of claim 25, wherein the information from the UE comprises a proposed power savings configuration for the sidelink.

27. The method of claim 25, wherein the information from the UE comprises one or more traffic patterns of the UE, scheduling information of the UE, one or more quality-of-service (QoS) targets of the UE, or a combination thereof.

28. The method of claim 25, wherein the information from the UE comprises a subset of one or more power savings parameters.

29. The method of claim 28, wherein the subset of the one or more power savings parameters comprises a requested duty cycle of active periods and sleep periods.

30. A wireless node for wireless communication, comprising:
   a memory comprising computer-executable instructions; and a processor configured to execute the computer-executable instructions and cause the wireless node to:
  receive information from a user equipment (UE) over a sidelink;
  forward, to a network entity over an access link, a proposed sidelink power savings configuration for the sidelink based on the information from the UE, wherein the proposed sidelink power savings configuration comprises a first one or more wake periods and a first one or more sleep periods; and
  receive, from the network entity, a power savings configuration for the access link and a coordinated sidelink power savings configuration for the sidelink, wherein:
    the power savings configuration for the access link comprises a second one or more wake periods and a second one or more sleep periods;
    the coordinated sidelink power savings configuration comprises a third one or more wake periods, adjacent to the second one or more wake periods, and a third one or more sleep periods; and
    the third one or more wake periods adjacent to the second one or more wake periods comprises each third wake period of a plurality of third wake periods being adjacent to a second wake period of a plurality of second wake periods.

31. The wireless node of claim 30, wherein the proposed sidelink power savings configuration for the sidelink, the power savings configuration for the access link, and the coordinated sidelink power savings configuration each comprises a discontinuous reception (DRX) configuration.

32. The wireless node of claim 30, wherein the information from the UE over the sidelink comprises the proposed sidelink power savings configuration for the sidelink.

33. The wireless node of claim 30, wherein the information from the UE over the sidelink comprises one or more traffic patterns of the UE.

34. The wireless node of claim 30, wherein the information from the UE over the sidelink comprises scheduling information of the UE.

35. The wireless node of claim 30, wherein the information from the UE over the sidelink comprises one or more quality-of-service (QoS) targets of the UE.

36. The wireless node of claim 30, wherein the information from the UE over the sidelink comprises a subset of one or more power savings parameters.

37. The wireless node of claim 36, wherein the subset of the one or more power savings parameters comprises a requested duty cycle of active periods and sleep periods.

38. The wireless node of claim 30, further comprising forwarding the coordinated sidelink power savings configuration for the sidelink to the UE.

39. The wireless node of claim 30, wherein the UE is out-of-coverage of the network entity.

40. A wireless node for wireless communication, comprising:
  a memory comprising computer-executable instructions; and
  a processor configured to execute the computer-executable instructions and cause the wireless node to:
    receive information from a user equipment (UE) over a sidelink;
    receive, from a network entity, a power savings configuration for an access link, wherein the power savings configuration for the access link comprises a first one or more wake periods and a first one or more sleep periods; and
    determine a coordinated sidelink power savings configuration for the sidelink based on the information and the power savings configuration for the access link, wherein:
      the coordinated power sidelink savings configuration for the sidelink comprises a second one or more wake periods, adjacent the first one or more wake periods, and a second one or more sleep periods, and
      the second one or more wake periods adjacent to the first one or more wake periods comprises each second wake period of a plurality of second wake periods being adjacent to a first wake period of a plurality of first wake periods.

41. The wireless node of claim 40, further comprising applying the power savings configuration for the access link for communicating with the network entity on the access link and applying the coordinated sidelink power savings configuration for the sidelink for communicating with the UE on the sidelink.

42. The wireless node of claim 40, further comprising providing the coordinated sidelink power savings configuration for the sidelink to the network entity, the UE, or both.

43. The wireless node of claim 40, wherein the power savings configuration for the access link and the coordinated sidelink power savings configuration each comprises a discontinuous reception (DRX) configuration.

44. The wireless node of claim 40, wherein the information from the UE over the sidelink comprises a proposed power savings configuration for the sidelink.

45. The wireless node of claim 40, wherein the information from the UE comprises one or more traffic patterns of the UE, scheduling information of the UE, one or more quality-of-service (QoS) targets of the UE, a subset of one or more power savings parameters, or a combination thereof.

46. The wireless node of claim 45, wherein the subset of the one or more power savings parameters comprises a requested duty cycle of active periods and sleep periods.

47. A network entity for wireless communication, comprising:
  a memory comprising computer-executable instructions; and
  a processor configured to execute the computer-executable instructions and cause the network entity to:
    obtain, from a wireless node over an access link, a proposed sidelink power savings configuration for a sidelink between the wireless node and a user equipment (UE), wherein the proposed sidelink power savings configuration comprises a first one or more wake periods and a first one or more sleep periods;
    determine a power savings configuration for the access link, wherein the power savings configuration for the access link comprises a second one or more wake periods and a second one or more sleep periods;
    determine a coordinated sidelink power savings configuration for the sidelink based, at least in part, on the proposed sidelink power savings configuration and the power savings configuration for the access link, wherein:
      the coordinated sidelink power savings configuration comprises a third one or more wake periods, adjacent to the second one or more wake periods, and a third one or more sleep periods; and
      the third one or more wake periods adjacent to the second one or more wake periods comprises each third wake period of a plurality of third wake periods being adjacent to a second wake period of a plurality of second wake periods; and output, to the wireless node, the power savings configuration for the access link and the coordinated sidelink power savings configuration for the sidelink.

48. The network entity of claim 47, wherein the coordinated sidelink power savings configuration is based on information from the UE to the wireless node.

49. The network entity of claim 48, wherein the information from the UE comprises one or more traffic patterns of the UE, scheduling information of the UE, one or more quality-of-service (QoS) targets of the UE, a subset of one or more power savings parameters, or a combination thereof.

50. The network entity of claim 49, wherein the subset of the one or more power savings parameters comprises a requested duty cycle of active periods and sleep periods.

51. The network entity of claim 47, wherein the proposed sidelink power savings configuration, the power savings configuration for the access link, and the coordinated sidelink power savings configuration each comprises a discontinuous reception (DRX) configuration.

52. A network entity for wireless communication, comprising:
a memory comprising computer-executable instructions; and
a processor configured to execute the computer-executable instructions and cause the network entity to:
output, to a wireless node, a first power savings configuration for an access link between the network entity and the wireless node, wherein the first power savings configuration for the access link comprises a first one or more wake periods and a first one or more sleep periods; and
obtain, from the wireless node, a second power savings configuration for a sidelink between the wireless node and a user equipment (UE), wherein:
the second power savings configuration for the sidelink comprises a second one or more wake periods, adjacent the first one or more wake periods, and a second one or more sleep periods; and
the second one or more wake periods adjacent to the first one or more wake periods comprises each second wake period of a plurality of second wake periods being adjacent to a first wake period of a plurality of first wake periods.

53. The network entity of claim 52, wherein the first power savings configuration and the second power savings configuration each comprises a discontinuous reception (DRX) configuration.

54. The network entity of claim 52, wherein the second power savings configuration is based on information from the UE.

55. The network entity of claim 54, wherein the information from the UE comprises a proposed power savings configuration for the sidelink.

56. The network entity of claim 54, wherein the information from the UE comprises one or more traffic patterns of the UE, scheduling information of the UE, one or more quality-of-service (QoS) targets of the UE, or a combination thereof.

57. The network entity of claim 54, wherein the information from the UE comprises a subset of one or more power savings parameters.

58. The network entity of claim 57, wherein the subset of the one or more power savings parameters comprises a requested duty cycle of active periods and sleep periods.

* * * * *